United States Patent [19]
Saunders

[11] Patent Number: 5,296,127
[45] Date of Patent: Mar. 22, 1994

[54] COMPOSITE-COATED FLAT-ROLLED SHEET METAL MANUFACTURE

[76] Inventor: William T. Saunders, c/o Weirton Steel Corporation, Weirton, W. Va. 26062-5133

[21] Appl. No.: 926,055

[22] Filed: Aug. 6, 1992

Related U.S. Application Data

[63] Continuation of Ser. No. 573,366, Aug. 27, 1990, abandoned, and a continuation-in-part of Ser. No. 318,677, Mar. 3, 1989, Pat. No. 5,084,358, which is a continuation-in-part of Ser. No. 855,694, Apr. 25, 1986, Pat. No. 4,812,365.

[51] Int. Cl.$^5$ .............................................. C25D 7/06
[52] U.S. Cl. ................................. 205/139; 204/181.1; 205/138; 205/198; 205/317
[58] Field of Search ...................... 204/181.1; 205/138, 205/139, 198, 317

[56] References Cited

U.S. PATENT DOCUMENTS

| | | | |
|---|---|---|---|
| 2,293,810 | 8/1942 | Domm | 204/34 |
| 3,663,383 | 5/1972 | Matsuda et al. | 204/181.1 |
| 3,778,355 | 12/1973 | Johnson et al. | 204/28 |
| 4,017,367 | 4/1977 | Saunders | 205/140 |
| 4,225,406 | 9/1980 | Wagener et al. | 204/180.2 |
| 4,761,212 | 8/1988 | Watanabe et al. | 204/181.1 |

OTHER PUBLICATIONS

Metal Finishing Guidebook and Directory for 1978, Metals and Plastics Publications, Inc., Hackensack, N.J., pp. 168-169, 572-591.

Primary Examiner—John Niebling
Assistant Examiner—William T. Leader
Attorney, Agent, or Firm—Raymond N. Baker

[57] ABSTRACT

Composite-coated flat-rolled sheet metal substrate subject to surface oxidation, after surface cleaning and oxidation removal is cathodically E-coated with minimal organic coating to stabilize such surface to prevent oxidation prior to application of protective organic coating finish to provide a total coating weight on each surface selected in the range of about 3 to about 20 mg/in$^2$ of organic coating per surface. Such E-coat being applied to such substrate after removal of surface oxidation so as to enhance coating adhesion of end product protective organic coating. Lubricant for draw processing is embodied in the protective organic coating as a "blooming compound" or can be precoated after such organic coating to enable draw-processing of articles such as a unitary cup-shaped can body while maintaining desired full surface protective organic coating to meet requirements for such article.

8 Claims, 2 Drawing Sheets

COMPOSITE-COATED FLAT-ROLLED SHEET METAL MANUFACTURE

This is a continuation of application Ser. No. 07/573,366, filed Aug. 27, 1990, now abandoned, the entire disclosure of which is incorporated herein by reference, and is a continuation-in-part of copending U.S. patent application Ser. No. 318,677, filed Mar. 3, 1989, now U.S. Pat. No. 5,084,358 which is a continuation in part of U.S. patent application Ser. No. 855,694, filed Apr. 25, 1986, now U.S. Pat. No. 4,812,365; such applications and patent being owned by the assignee of the present application.

This invention relates to processing flat-rolled sheet metal including surface preparation and coating methods which enhance adhesion of protective organic coatings for purposes of fabricating shaped products In one of its more specific aspects, this invention is concerned with a new composite-coated flat-rolled sheet metal substrate can stock which can be used directly for fabrication of can parts, such as draw-processed one-piece cup-shaped can bodies, while maintaining full surface protection of the substrate.

Various surface treatments of sheet metal involving coatings which are largely metallic in composition have been considered necessary in order to facilitate further manufacturing processing and/or fabricating processing of the flat-rolled metal. For example, chrome-chrome oxide coating has long been considered necessary in the manufacture of flat-rolled steel for subsequent processing and adhesion of organic coating protection (see, for example, U.S. Pat. No. 3,826,628).

However, such metallic platings require high capacity and expensive electrolytic processing. And, while widely used, such metallic plating processes are now being criticized for environmental protection purposes relating to suitable disposal of metallic plating bath wastes.

The teachings of the present invention supplant requirements for such metallic or other inorganic electrolytic platings previously considered as a prerequisite in the processing of flat-rolled sheet metal in preparation for fabricating can parts or other articles.

Other advantages and contributions are considered in more detail in describing embodiments of the invention shown in the accompanying drawings, in which.

Figure 1:
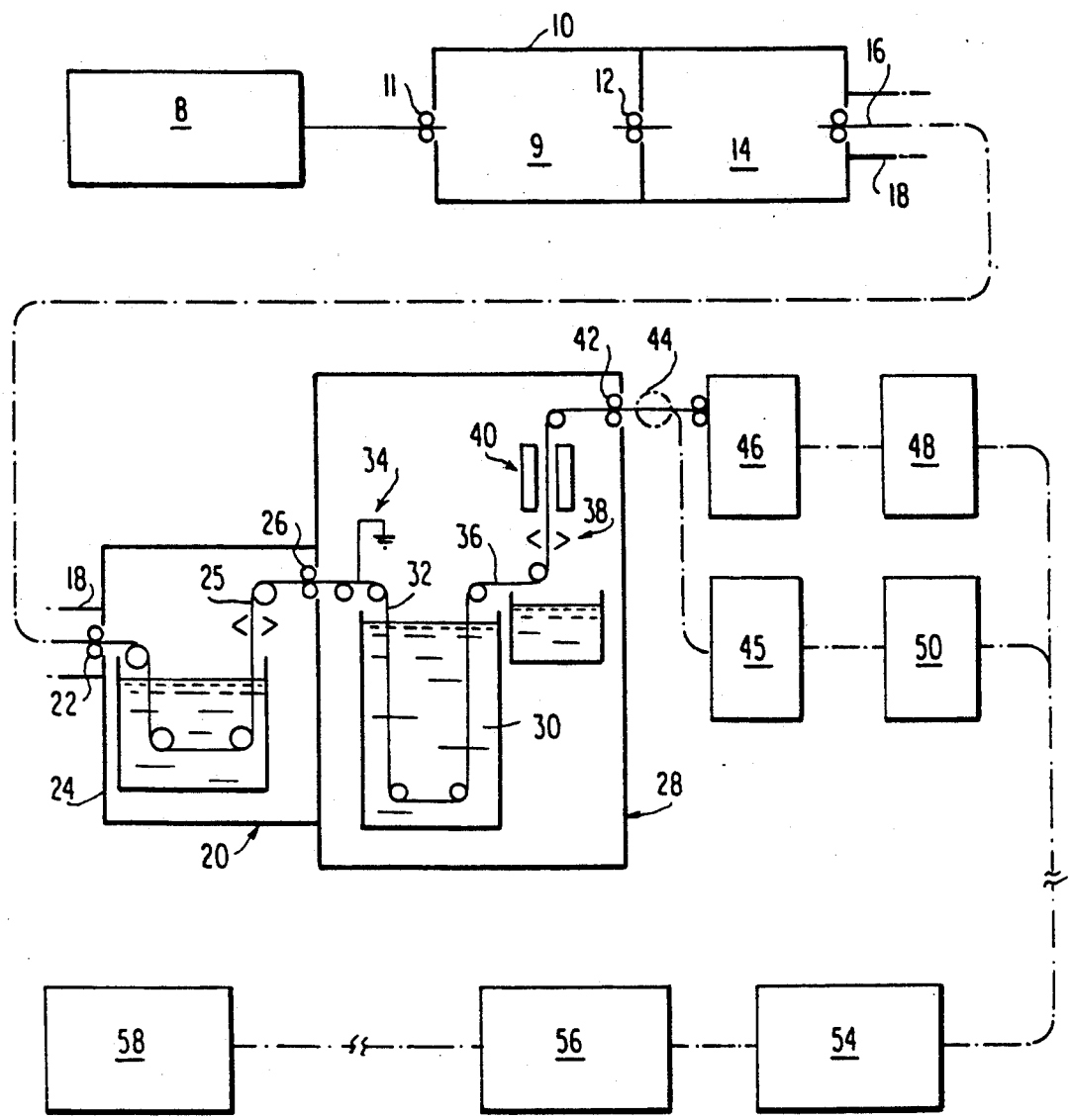
FIG. 1 is a schematic general arrangement view using box diagrams for describing flat-rolled sheet metal processing in accordance with the present invention.

The invention is concerned with processing flat-rolled primary metals (such as steel and aluminum) which are inherently chemically active, subject to surface oxidation which is detrimental to adhesion of a preferred-type of protective coating desired for fabricating sheet metal articles. Flat rolled aluminum may have a thickness gage of about 0.005 inches to about 0.015 inches.

Extensive and expensive metallic or other inorganic electrolytic plating processing of such flat-rolled metals has been a prerequisite in the past in an attempt to provide a substrate surface to which an organic polymerizable coating would adhere. Electrolytically applying a combination of chrome and chrome oxide has been widely relied on commercially.

In addition to environmental questions now being raised in relation to such electrolytic plating processes, the integrity of organic coatings for purposes of protecting against dissolution of certain metals commonly used in canmaking is a continuing concern.

The present invention eliminates the aforementioned metallic plating requirements for flat-rolled sheet metal processing purposes while providing for enhanced surface adhesion so as to provide for desired protective organic coating while maintaining surface protection throughout can body fabrication and container usage.

A new composite-coated sheet metal product is provided which enables fabrication of shaped parts without requiring additional protective organic coating or organic coating repair subsequent to fabrication. In a specific embodiment of the invention both surfaces of cold-rolled, low-carbon flat-rolled steel (in the range of about fifty (50) to about one hundred ten (110) pounds per base box) are prepared and composite coating is carried out prior to fabrication along with providing selectively the type and amount of protection on each surface to meet can making requirements of that surface.

Such new composite-coated flat-rolled product, with steel as a substrate, contributes significant canmaking advantages in draw-processing can parts. For example, one-piece can bodies can be fabricated directly from double-reduced steel (blackplate), which has been pretreated and precoated in flat-rolled form prior to fabrication; or, end closures can be fabricated from either single-reduced or double-reduced blackplate substrate protected and precoated as disclosed herein; all while maintaining full surface protection as desired for fabrication and canmaking purposes "Double-reduced" as used herein refers to work hardened flat-rolled steel; for background on single-reduced and double-reduced see *Making, Shaping and Treating Steel*, 10th Ed., Chapter 36, p. 1144, ©AISE, printed by Herbick & Held, Pittsburgh, Pa. Work hardened sheet metal substrate is less susceptible to change in metal characteristics during fabrication and is preferred for draw-process shaping of one-piece cup-shaped articles, especially deep drawn articles, for example, cylindrical can bodies where side wall height exceeds cross-sectional diameter.

Flat-rolled sheet metal-processing is made available throughout base metal surface preparation and protection. Significant objectives of the invention are to provide sheet metal substrate protection for further processing while enhancing adhesion of desired organic coating for protection of fabricated articles. An important resulting contribution is eliminating the inefficient handling requirements and difficulties encountered in attempting to apply suitable protective organic coating, or organic coating repair, after fabricating such parts as one-piece cup-shaped can bodies.

More uniform, complete and dependable organic coating protection is thus available; application is carried out on sheet metal substrate while in the flat-rolled form which facilitates surface preparation and protection; and, provides adhesiveness not available when trying to protect hard-to-access surfaces of individual shaped articles after fabrication.

More specifically, adhesion of an organic polymerizable coating so as to facilitate fabrication and for container content protection is enhanced by stabilizing flat-rolled sheet metal when its surfaces are most actively subject to oxidation to produce a composite-coated flat-rolled product which can, for example, be fabricated by draw processing into a one-piece cup-shaped can body while maintaining coating protection over the full surface of the base metal. Sheet metal processing and end product fabrication are thus made more efficient and more economical.

Surface stabilization is provided when the sheet metal surface is most chemically active by electrolytically depositing a thin receptor coating of an organic polymerizable material deposited from an aqueous carrier (referred to as "E-coating") which enables further manufacturing processing; and, also provides for subsequent fabricating processing as well by enhancing adhesion of a protective organic coating during and after fabrication of parts such as one-piece sheet metal can bodies.

Referring to FIG. 1, processing of flat-rolled sheet metal substrate, such as blackplate as received from cold rolling at source 8, is initiated by introduction into surface preparation stage 9. Surface preparation can include techniques for removal of surface debris selected from mechanical action or fluid action scrubbing, chemical treatment, electrolytic cleaning and/or combinations thereof.

In a preferred embodiment, such surface preparation is carried out while the substrate is wet and at least partially submerged in a treatment solution; and/or, atmosphere is controlled, for example in housing 10, to prevent any further surface oxidation of the cold-rolled substrate as received. Entrance rollers 11 help provide for desired surface protection while exit rollers 12 prevent carryover of cleaning or rinse solution into surface oxidation removal station 14. Liquid acid pickling solution treatment is a preferred form of surface oxidation removal which facilitates continued surface protection by wetting of the surface during processing.

Strip 16, free of surface oxidation, is fed through atmosphere-controlled chute 18, or otherwise directly for rinsing to the extent required, into atmosphere-controlled rinse station 20 by means of entry rollers 22. Atmosphere control, as used herein, refers to controlling atmosphere to be sufficiently neutral or reducing to avoid surface oxidation; or, other control of such atmosphere as required to prevent other contamination of the surface. The objective at this stage is to establish clean substrate surface from which oxidation has been removed for immediate presentation of freshly deoxidized sheet metal substrate surface for improved coating purposes Atmosphere control and decreased handling by avoiding recoiling and uncoiling during composite coating are preferred processing which improve product quality and production efficiency. However, steel substrate which is cleaned by wet processing to remove surface debris can be subsequently brought to the desired protective organic coating adhesion readiness for composite coating for many purposes by liquid acid pickling followed by direct E-coating as taught herein.

The handling practice during and after removal of surface oxidation is important for surface adhesion of subsequent coating in the composite coating process. For example, liquid acid pickling facilitates obtaining and maintaining an oxide-free surface until stabilized to enable handling and subsequent organic protective coating processing; stabilizing the substrate surface and coordinating coating for fabrication purposes are important contributions to the composite coating process and product of the present invention. One or both surfaces can be prepared for processing; preferably, both surfaces are prepared and stabilized for subsequent processing to desired characteristics; protection and other surface characteristics can then be selected for each surface in later stages.

After such cleaning and acid pickling, the substrate 16, free of surface oxidation, can be rinsed to the extent required as indicated at station 20 in controlled-atmosphere housing 24. Strip 25 exits through rollers 26 into controlled-atmosphere station 28 where it is directed into E-coat bath 30.

During substrate preparation, it is important to deliver the oxide-free surface of the substrate without undue delay into E-coat bath 30, free of any opportunity for surface oxidation such as contact with an oxidizing atmosphere. Preferably both surfaces of the flat-rolled sheet metal are prepared and oxide removed from both surfaces for E-coating directly on both freshly-prepared, oxide-free surfaces; and, it is important to carry out cathodic E-coating in order to help prevent surface oxidation.

In accordance with the invention, E-coat aqueous bath 30 deposits a thin film organic coating directly from the bath which bonds with clean, oxide-free substrate surface electrolytically as well as mechanically as discussed later herein. The film deposited is selected to be sufficient to stabilize such surface so as to prevent oxidation in further processing; about one-half to one $mg/in^2$ of organic coating is a preferred range for cold-rolled steel finishes. Such coating weight can be increased with increasing surface roughness in order to achieve complete electrolytic surface deposition of a thin coverage but such E-coat should not eliminate the matte or roughened surface entirely. Such E-coat organic coating material is deposited electrolytically from an aqueous bath by control of polarity of substrate and coating material. As taught herein, the strip should be cathodic so as to avoid formation of oxygen at the surface during such E-coating; any hydrogen generated at the cathodic surface is reducing. Such E-coat material in the electrolyte bath seeks out void areas of the metal surface which are free of organic coating and, thus, are electrically conductive, for electrolytic deposition on such conductive surface.

Strip 32 is preferably directed within non-oxidizing atmosphere-controlled housing 28 through a strip polarity control station, such as 34, to be cathodic for passage into and through electrolytic bath 30. As a result, an organic E-coat is uniformly deposited over the full exposed surface of the sheet metal substrate.

From E-coat bath 30 E-coated strip 36 travels upwardly through station 38 for rinse removal of excess (non-bonded) organic E-coating material and/or solution, then for drying and/or partial curing in station 40.

Figure 2:
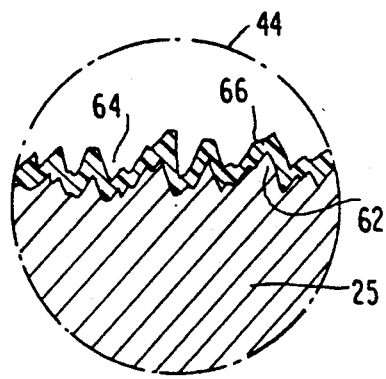
FIG. 2 is a magnified cross-sectional view of a surface of sheet metal product during processing as indicated in FIG. 1.

The electrolytically deposited organic coating is hardened and cured at least to the extent to permit passage through rollers 42 as E-coated flat-rolled product 44 (surface shown in magnified cross section in FIG. 2).

The E-coat as bonded electrolytically with the oxide-free surface protects the flat-rolled sheet metal against surface oxidation during processing; and, also, with small amounts of water, can act as a receptor for desired protective organic coating to be subsequently applied. By selecting compatible organic polymerizable materials the E-coat (with water removed) exhibits a surfactant-like characteristic for subsequent protective organic coating; it also provides for enhanced adhesion of protective organic coating for purposes of facilitating shaping and in maintaining, notwithstanding draw processing fabrication into cup-shaped work product, full surface organic coating protection of container contents from contact with substrate metal.

E-coat bath 30 is utilized to deposit a primer-type organic coating, such as an epoxy, which is compatible upon proper curing, with and improves adhesion of subsequent organic coating(s). Selecting E-coat materials can permit utilization of partial curing at station 40 in order to facilitate handling through rollers 42 while enabling delay of full curing of such E-coated organic material for purposes of augmenting adhesion of subsequently applied heavier organic coating. In a specific example, after E-coating, and removal of any water, an epoxy layer of about 2.5 to about 5 mg/in$^2$ is added to each surface and a vinyl organosol of about 7.5 to 10 mg/in$^2$ is added to at least one surface.

In preferred practice, E-coat strip 44 is fed directly into protective coating station 45 which is atmosphere-controlled to avoid surface contamination by particulate matter. The E-coat also enables alternative processing by coiling or accumulation as cut sheets at station 46 for subsequent processing (including protective coating) at station 48.

The protective organic coating is applied at station 45 or 48 so as to embody a processing lubricant. As described in more detail in U.S. pending patent application, Ser. No. 07/573,548, now U.S. Pat. No. 5,119,657 entitled DRAW-PROCESS METHODS, SYSTEMS AND TOOLING FOR FABRICATING ONE-PIECE CAN BODIES, filed by applicant concurrently herewith, which is included herein by reference, spray or roller application of organic coating material in a solvent can be utilized. The solvents contain about 20% to about 40% organic coating solids; and, in addition, solids in the form of a "blooming compound." The latter refers to a lubricant incorporated with the organic coating and made available at the surface of the organic coating in response to heat and/or pressure during subsequent fabrication of the composite-coated stock. In a specific embodiment, the blooming compound solids content comprises about one to about two percent by weight of the solids content; that is, about five to ten percent by weight of the organic coating solids dependent on the organic coating. The type and amount of blooming compound is selected along with the type of protective organic coating dependent on requirements for each surface during fabrication or subsequent use. In canning comestibles, such blooming compound is selected from approved lubricants such as petrolatum, lanolin or other fatty acid derivatives of animal or vegetable oil. The public side surface for such sheet metal food cans, or both surfaces for non-comestible articles can use other lubricants. Organic coatings with blooming compound for cup-shaped container draw processing fabrication in accordance with present teachings are being made available through The Valspar Corporation, 2000 Westhall Street, Pittsburgh, Pa. 15233; the Midland Division of The Dexter Corporation, East Water Street, Waukegan, Ill. 60085; or, BASF Corporation of Clifton, N.J.

Such a blooming compound can also be included in a solid film organic coating laminate which is added to the E-coat surface after the E-coat water is drawn off; an adhesive can be utilized for such purpose. Such solid film can also be cured in place along with completion of a partially cured E-coat so as to be free of use of a separate adhesive.

Further, in preferred practice as taught herein, after or upon curing of the protective organic coating for food container product in which about one to two percent blooming compound solids content is used, an added lubricant, selected as required to meet the fabrication process and end product requirements, is surface-applied to the organic coat. Station 50 (FIG. 1) is used for such purpose in the first illustrated handling system; and, station 52 is an alternative handling system. The surface lubricant, for example a draw lubricant, is selected based on fabricating requirements for each surface; for example, the public-side surface has more demanding requirements in draw-processing fabrication of one-piece sheet metal substrate can bodies for canning comestibles while the product-side surface is limited as to the type of lubricant, such as petrolatum, approved by regulatory agencies such as the U.S. Food & Drug Administration. While other surface lubricants could be used for such external surface, in practice a lubricant such as petrolatum is preferred for both surfaces in canning foodstuffs.

In addition to selection of an organic coating for a surface, or an organic coating system which combines more than one organic coating type per surface, the total fabricating process lubricant is quantitatively selected for each surface. For draw processing fabrication of one-piece can bodies, total lubricant (blooming compound and surface applied) for a surface is selected between about fifteen (15) to about twenty (20) mg per sq. ft. dependent on surface requirements for the fabricated product.

Such composite-coated product stock (shown in enlarged cross section in a later figure) is accumulated at station 54 in a desired flat-rolled form—strip, sheet or cut blanks for the fabrication processing. Prior to being directed to fabrication, such total lubricant per surface is preferably verified at station 56. Such determination prior to feeding of the flat-rolled product into fabricating processing line 58 is part of making such fabricating independent of requirements for proper surface preparation and coating.

As delivered from E-coating chamber 28, flat-rolled product 44 is surface stabilized by electrolytic bonding of primer-type organic coating; for example, an epoxy. Such stabilizing coat, as applied electrolytically, fully covers what had been exposed metal; a textured finish for the metal is preferred. A desired texture can be accomplished by the cold rolling finishing operations. For example, "matte" or a "dull finish" is available by cold rolling low carbon steel with roughened rolls; other textured finishes are available by rolling with moderately smooth rolls (*Making, Shaping and Treating Steel*, 9th Ed., ©1971, p. 964, printed by Herbick & Held, Pittsburgh, Pa.). The invention utilizes such cold-rolled texture to add a mechanical factor to the "bonding" that takes place with E-coating and the later protective organic coatings as taught herein. The surface texture of the cold rolled steel is largely maintained during the lightweight E-coating; this contributes a mechanical interlocking factor to the electrolytic and chemical bonding which takes place between a freshly deoxidized surface and the E-coat primer; and, maintaining some texture during E-coating subsequently contributes a mechanical interlocking factor for the protective organic coating(s) forming part of the composite coating of the invention.

A lightweight primer coating, about one-half to one mg/ft$^2$, is selected to cover exposed metal of the textured surface; that is, along peaks and valleys, without, however, filling such valleys (see FIG. 2) of the cold rolled sheet metal. Such coverage stabilizes the metal so as to prevent surface oxidation while maintaining a mechanical-linking factor which in combination with other chemical bonding aspects of the subsequent protective organic polymerizable material coating provides an enhanced adhesion for purposes of fabricating shaped articles.

As shown in the magnified schematic view of product 42 in FIG. 2, base metal 25 has a surface texture which includes peaks 62 and valleys 64. And, the lightweight E-coat 66 follows such contour such that a surface texture remains after E-coating.

Figure 3:
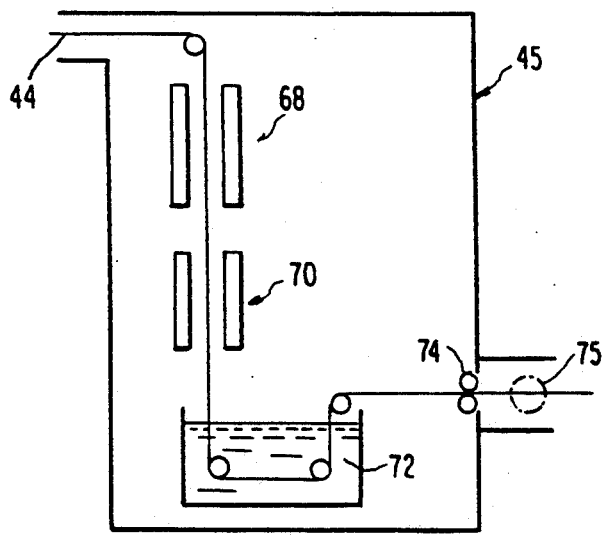
FIG. 3 is a schematic presentation of a portion of a continuous-strip embodiment of the processing line of FIG. 1.

E-coated product 44, after drawing off any water from the E-coat operation, is preferably fed directly into housing 45 (shown in more detail in FIG. 3) for addition of protective organic coating for fabricating. The ambient atmosphere within housing 45 is controlled to the extent necessary to avoid deposition of solid contaminating particulate matter. Organic coating zone 68 enables selective coating on each surface by solvent spray or roller application; and, can provide for laminating a solid film, with and without an adhesive.

The solvent used for protective organic coating(s) applied in zone 68 is removed in zone 70 and/or the coating is at least partially cured in the latter zone. The coated strip is cooled in bath 72 and led to exit rollers 74 as coated flat-rolled product 75.

Figure 4:
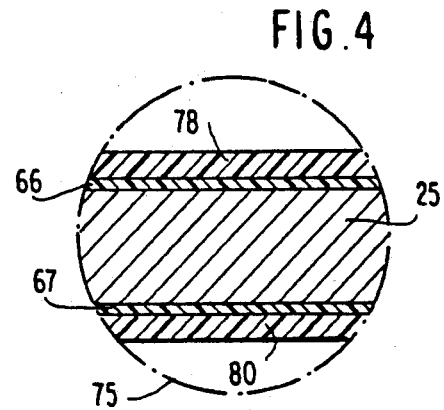
FIG. 4 is an enlarged cross-sectional view of flat-rolled product during processing as indicated in FIG. 3; and, FIG. 5 is a schematic presentation of a portion of the continuous-strip embodiment of FIG.1.
Figure 5:
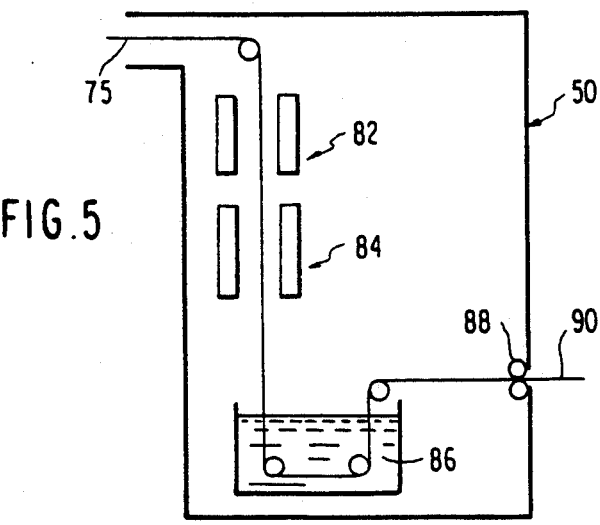

The protective organic coating for fabricating is applied so that a smooth finish coating results as indicated in the schematic cross-sectional view of FIG. 4. As taught herein, organic coating(s) in a range of about two and one-half (2.5) to about twenty (20) mg/in$^2$ of protective organic coating per side is applied dependent on end product usage; for one-piece can bodies organic coating of about 2.5 to about 5 mg/in$^2$ with proper lubricant can be adequate for the public-side surface while an organic coating of at least about 7.5 to about 10 mg/in$^2$ is preferred for the product-side surface.

In FIG. 4, the base metal 25 includes the lightweight E-coat, shown schematically as layer 66, 67 on each surface; and, a protective organic coating, such as 78 and/or 80, for each surface. The protective organic coating selected for each surface can include more than one organic polymerizable material, embodies a blooming compound as described earlier and, when applied in solvent or solid film form, is applied after removal of water from the E-coat.

Also, as part of the composite coating teachings, coated flat-rolled product 75 is directed to housing 50, which preferably is atmosphere-controlled to prevent deposition of particulate matter. Processing lubricant is selectively applied to each surface, for example, by roller and/or spray coating in a solvent at zone 82. The solvent is removed at zone 84. Product is directed through cooling bath 86 for exit through rollers 88 as composite coating 90.

Figure 6:
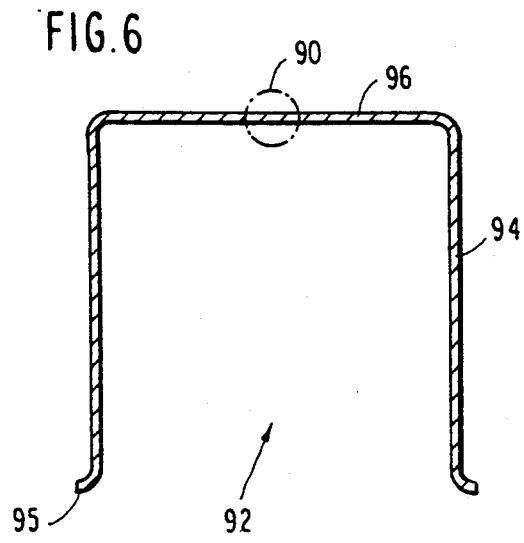
FIG. 6 is a cross-sectional view in a plane which includes the centrally located longitudinal axis of a fabricated cup-shaped article such as a redrawn one-piece can body; and, FIG. 7 is an enlarged cross-sectional view of a portion of FIG. 6.

The cup-shaped product configuration of FIG. 6 is produced by drawing a flat-rolled blank into a cup shape and then redrawing; such product 92 includes side wall 94, with flange 95 at its open end, and unitary endwall 96.

Figure 7:
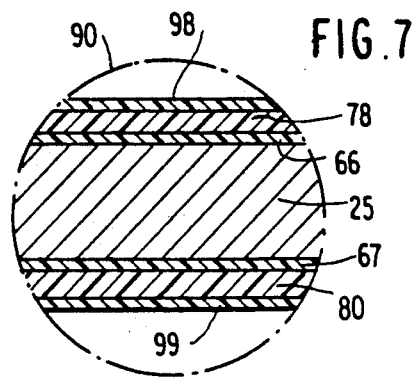

Endwall 96 has the same coating thickness and starting gage as product 90; therefore, the cross-sectional schematic view of a portion of endwall 96 shown in FIG. 7 is the same as composite coated product 90. In such embodiment, base metal 25 includes E-coat 66, 67; and, on each E-coat surface a protective coating of organic coating material 78, 80 (which preferably includes a blooming compound), followed by a selected lubricant and lubricant coating weight for each surface layer 98, 99.

Representative values for a specific embodiment are:

| | |
|---|---|
| Base Metal | 50–110#/bb flat-rolled steel |
| Pickling Solution | Hydrochloric acid |
| E-coat | .5 to 1 mg/in$^2$ per surface |
| Preferred E-coat Material | Epoxy |
| Protective organic coat | 2.5 to 20 mg/in$^2$ per surface |
| Protective organic coat selection | Acrylics, epoxies, vinyls, organosols, polyesters and solid film laminates |
| Total lubricant | 15–20 mg/ft$^2$ per surface |

While specific materials, dimensions, weights and other values have been set forth for purposes of describing the invention, it should be recognized that other materials and values can be adapted in the light of the above teaching without departing from concepts of the invention; therefore, in determining the scope of the invention reference shall be made to the appended claims.

I claim:

1. Process for preparing and protecting flat-rolled sheet metal for fabricating pre-coated sheet metal can parts ready for direct use as fabricated for canning comestibles, comprising the steps of providing flat-rolled sheet metal selected from the group consisting of flat-rolled steel in the range of about 50 to about 110 pounds per base box and flat-rolled aluminum having a thickness range of about 0.005 inches to about 0.015 inches;

presenting opposed planar surfaces subject to surface oxidation;

cold-rolling the sheet metal with roughened rolls to provide a surface texture on each of its planar surfaces which contributes to mechanical interlocking of the subsequently applied coating;

delivering the cold-rolled textured-surface sheet metal for removal of surface oxidation;

carrying out removal of oxidation from both textured sheet metal surfaces to present a substrate for application of organic polymeric coating to provide can stock; then directing the substrate into an E-coat aqueous bath in a manner to avoid oxidation of its textured surfaces, selectively applying an organic coating from the aqueous bath solely by electrolytic means so as to stabilize each surface against oxidation while retaining at least a portion of said texture on each said E-coated surface, said electrolytic coating from the E-coat aqueous bath being carried out with the sheet metal substrate as the cathode;

drying said coated surfaces as directed from the E-coat aqueous bath so as to remove moisture and at least partially cure said E-coat organic coating; and non-electrically applying a smooth-finish outer-surface protective organic coating to produce at least one composite-coated surface on which total organic coating is in the range of above about three mg/in$^2$ to about twenty-one mg/in$^2$ of said composite-coated surface and, then treating the coated substrate for purposes of curing said organic coatings;

wherein a lubricant is added to the can stock by incorporating a blooming-compound draw lubricant into the outer-surface organic coating, applying a surface-applied draw lubricant onto the outer surface coating, or a combination thereof; and wherein the composite-coated sheet metal is free of metal or metal compound coatings.

2. The process of claim 1, including the step of preparing the flat-rolled sheet metal by surface cleaning selected from the group consisting of mechanical scrubbing, dynamic-fluid scrubbing, chemical treatment, electrolytic cleaning and combinations thereof.

3. The process of claim 2, including the step of selecting the flat-rolled steel substrate, and in which the step of removing surface oxidation comprises wet processing both substrate surfaces in an acid pickling liquor, and directing the flat-rolled steel substrate from which oxidation has been removed from each surface by the pickling liquor in a controlled manner to avoid surface oxidation prior to carrying out said E-coating step on both said oxidation-free surfaces of the steel substrate.

4. The process of claim 3, in which the flat-rolled steel is provided as continuous strip, and non-electrolytic application of said outer-surface organic coating is carried out by selection from the group consisting of a solvent solution of organic coating, a solid laminate of organic coating and a combination thereof.

5. The process of claim 1 including selecting flat-rolled steel substrate, and, in which said drying step of said E-coat organic coating is carried out to permit direct application of an outer-surface finish organic coating to both surfaces of E-coated steel substrate, the outer surface finish organic coating is applied to each said planar surface such that total composite E-coat and finish organic coating on each surface is in the range of above about three mg/in$^2$ to about twenty-one mg/in$^2$ of composite-coated surface.

6. The process of claim 5 in which said non-electrolytically applied outer-surface polymeric organic coating added to each said E-coated surfaces is selected from the group consisting of acrylics, epoxies, organosols, polyesters, vinyls and solid film laminates selected from the group consisting of polyurethanes, polypropylenes, polyethylenes and polyalkyline terephthalates.

7. Process for enhancing coating adhesion of an outer-surface protective organic coating on both surfaces of a composite-coated flat-rolled steel can stock so as to enable direct fabrication by draw-processing into one-piece can bodies without damage to the flat-rolled steel substrate or composite-coated surfaces, comprising the steps of providing flat-rolled steel in the range of about 50 to 110 pounds per base box suitable for application of polymeric coating to provide can stock, cold rolling the flat-rolled steel with roughened rolls to provide a surface texture on each surface which contributes to mechanical interlocking of the subsequently applied coatings, then preparing both textured surfaces of the flat-rolled steel for coating by surface cleaning and removal of surface oxidation;

directing the flat-rolled steel substrate into an aqueous electrolytic coating bath in a manner to avoid oxidation of its textured surfaces;

electrolytically applying organic coating from an aqueous E-coat bath to both said flat-rolled steel surfaces so as to maintain, at least a portion of, the texture in the E-coated surfaces, then drying said E-coat organic coating so as to at least partially cure said organic coating on both said surfaces of handling and subsequent coating application; then non-electrolytically applying a finish outer-surface protective organic coating to each E-coat organic coating surface with said non-electrolytic application of protective organic coating being selected from the group consisting of applying organic coating in a solvent solution, applying a solid film organic coating as a laminate, and combinations thereof, with the total organic coating on each surface being in the range above about three mg/in$^2$ to about twenty-one mg/in$^2$; and, then curing said organic coating on both surfaces of steel substrate;

wherein a lubricant is added to the can stock by incorporating a blooming-compound draw lubricant into the outer-surface organic coating, applying a surface-applied draw lubricant onto the outer-surface organic coating, or a combination thereof; and wherein the composite-coated sheet metal is free of metal or metal compound coatings.

8. The process of claim 7, further including draw-processing said lubricated composite-coated substrate to produce a one-piece can body ready as formed for direct use in canning comestibles with said composite-coated organic coating being integral with and extending over both opposed surfaces of said draw processed can body.

* * * * *